AMPLITUDE-SENSITIVE MULTISTATE DEVICE

Filed Dec. 30, 1950

4 Sheets-Sheet 1

INVENTOR
W. M. GOODALL
BY H. O. Wright
ATTORNEY

Dec. 11, 1956 W. M. GOODALL 2,773,981

AMPLITUDE-SENSITIVE MULTISTATE DEVICE

Filed Dec. 30, 1950 4 Sheets-Sheet 2

INVENTOR
W. M. GOODALL
BY H. O. Wright
ATTORNEY

Dec. 11, 1956 W. M. GOODALL 2,773,981

AMPLITUDE-SENSITIVE MULTISTATE DEVICE

Filed Dec. 30, 1950 4 Sheets-Sheet 3

INVENTOR
W. M. GOODALL
BY H. O. Wright
ATTORNEY

INVENTOR
W. M. GOODALL
BY H. O. Wright
ATTORNEY

United States Patent Office 2,773,981

Patented Dec. 11, 1956

2,773,981

AMPLITUDE-SENSITIVE MULTISTATE DEVICE

William M. Goodall, Oakhurst, N. J., assignor to Bell Telephone Laboratories, Incorporated, New York, N. Y., a corporation of New York Application December 30, 1950, Serial No. 203,662

8 Claims. (Cl. 250—27)

This invention relates to electrical transmission systems and more particularly to amplitude sensitive multistate devices therefor.

In the broad field of electronic endeavor in which devices responsive to variously shaped wave forms are employed, such as for example, electronic ranging and object locator equipments, television equipments, and equipments in the various pulse code transmission systems, considerable application has been made of the discontinuous characteristics produced by electronic devices having a plurality of operating conditions or states of operation. These states of operation usually depend upon different stable levels of conduction through the electronic devices which levels represent a given relationship, for example, time, amplitude, or phase between two or more variable input parameters. This input information may be represented by varying levels of current or voltage, and likewise the output intelligence may be represented by two or more levels of voltage or current produced by the different states of operation of the devices.

It is an object of the present invention to indicate by the particular state of operation of a simple electronic device whether the instantaneous amplitude of one or two input parameters is greater or less than that of the other of said input parameters and to indicate by sudden change of state the instant of equality between said two parameters.

It is a further object of the invention to render the particular states of operation of the multistate device independent of the boundary conditions of saturation and cut-off of thermionic vacuum tubes.

These objects are attained, in the simple embodiments to be described by way of illustration of the principles of the invention, by means of a circuit arrangement comprising a thermionic vacuum tube amplifier which normally has a large amount of negative feedback and, therefore, a large factor of attenuation in its transmission characteristic to an input signal, and a switch circuit responsive to the relation of the input signal to a reference level interconnected with the amplifier in a particular way. When the level of the input signal is on one side of the reference level, for example, is negative with respect to the reference level or is less than the reference level, the output current of the amplifier will be determined by the usual components in the amplifier circuit, and because of the large amount of negative feedback, the output current will be substantially independent of the input signal. On the other hand, when the input signal is on the other side of the reference level, for example, greater than or positive with respect to the reference level, the switch circuit will connect a shunt path around a portion of the amplifier output circuit current path, and thereby change the state of operation of or the level of conduction through the device a given amount. Again because of the large amount of negative feedback, the output current will be substantially independent of the input signal. When the input signal is equal to the reference level, the condition of the switch circuit will be such as to substantially short-out the negative feed-back, placing the amplifier in a condition of high transmission gain, which will accelerate the above-mentioned change from one state to the other.

In one particular embodiment of the invention, the switch circuit is arranged to connect the shunt path around a large impedance in the cathode portion of the amplifier output circuit with the particular advantages therefrom to be pointed out in detail hereinafter.

In an alternative embodiment of the invention, the switch circuit is arranged to connect the shunt path around the anode portion of the amplifier output circuit to obtain the further advantage to be pointed out in detail hereinafter.

It is a subsidiary object of the invention to produce the desired change of state of the multistate device in response to an exceedingly small increment of input voltage level in the vicinity of the reference level.

In separately illustrated modifications of the embodiments described above, the last-mentioned subsidiary object is accomplished by an application of positive regeneration during the transition region in which the small increment of input voltage produces the desired change of state. In one modification positive regeneration is obtained by utilizing the negative resistance effect of certain semiconductor materials. In an alternative modification positive feedback in particular amount is employed to obtain this positive regeneration.

It is a further subsidiary object of the invention to render the level of conduction in the output circuit of the multistate device in the two states of operation on either side of the transition region independent of the particular amplitude of the input signal.

This last-mentioned subsidiary object is accomplished in separately illustrated modifications of the invention wherein, in addition to the effect of the negative feedback already mentioned the level of conduction is maintained constant during the two states of operation either by particularly chosen and connected constant current sources or by a novel summation of the conduction in separate parts of the circuit to obtain a net constant level of output conduction.

These and other objects, the nature of the present invention, and its various features and advantages, will appear more fully upon consideration of the various specific illustrative embodiments and the modifications thereof, shown in the accompanying drawings and in the following detailed description of these embodiments and the modifications thereof.

In the drawings:

Fig. 1 shows in electrical schematic diagram form an embodiment of the multistate device in accordance with the invention;

Figs. 2A through 2F given by way of illustration are the electrical characteristics of different portions of the device of Fig. 1 during an assumed cycle of operation;

Figs. 3A and 3B, given by way of illustration, are the generalized current and voltage characteristics, respectively, of the multistate device of Fig. 1;

Fig. 4 shows in electrical schematic diagram form a second embodiment of the multistate device in accordance with the invention;

Figs. 5A and 5B, given by way of illustration, are the generalized current and voltage characteristics, respectively, of the multistate device of Fig. 4;

Figures 1, 2A, 2B, 2C, 2D, 2E, 2F, 3A, 3B:
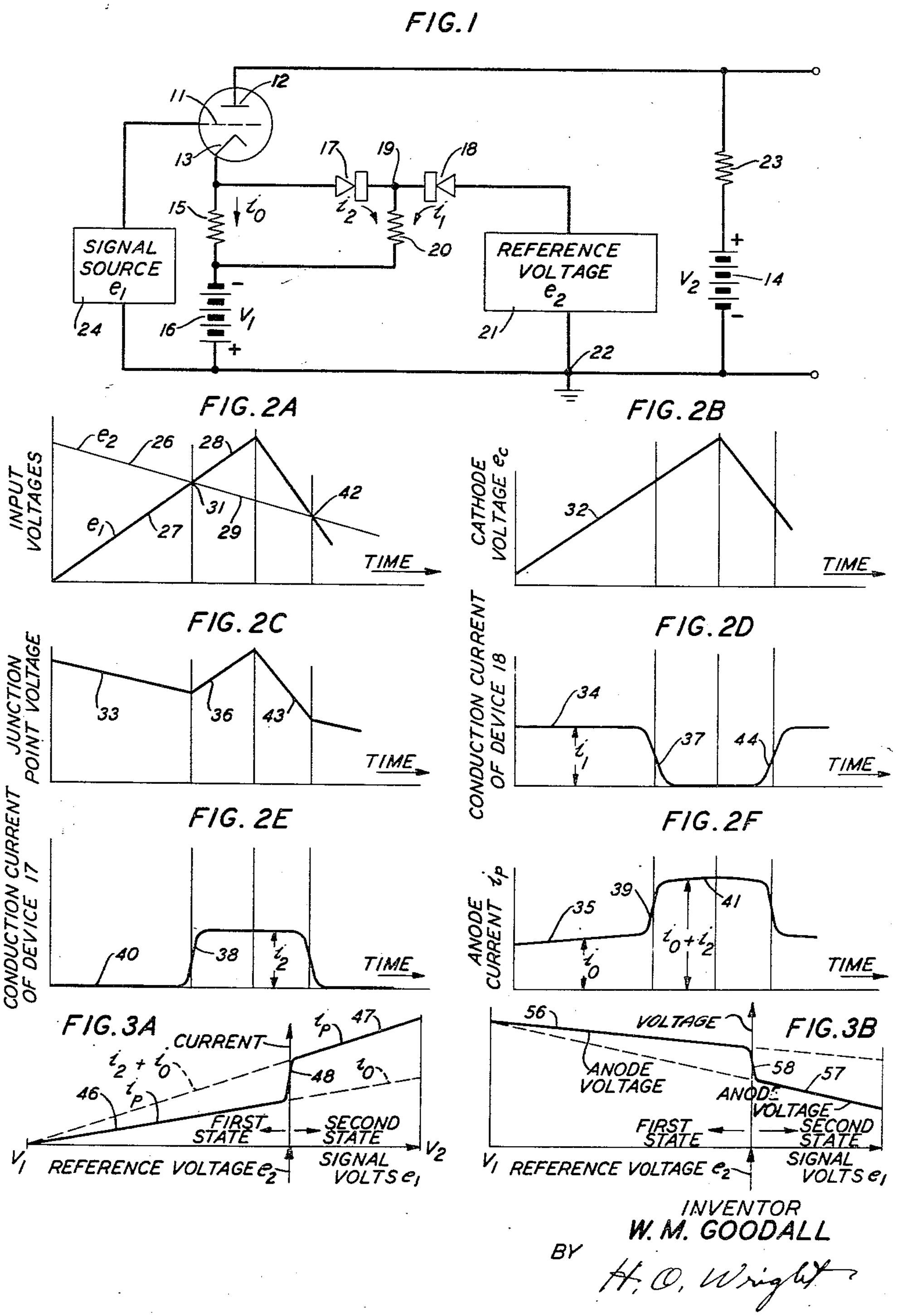

In Fig. 1, the amplitude sensitive multistate device in accordance with the invention is shown in schematic diagram form in one of its most simple configurations. As shown, the circuit of Fig. 1 comprises a thermionic vacuum tube amplifier having at least a control electrode or grid 11, an anode 12, and a cathode 13. An output circuit is connected from anode 12 to cathode 13, which circuit comprises the series combination in the order named of a load impedance 23, a multilevel source of anode potential comprising sources 14 and 16, and a cathode impedance 15. The anode potential is divided into a positive voltage $V_2$ from source 14 and a negative voltage $V_1$ from source 16 in order to obtain an intermediate potential point 22, the voltage level of which point 22 will be considered as ground or the reference for all voltages or potentials referred to hereinafter. Sources 14 and 16 are each connected with their positive terminals in the direction of the anode 12. The value of cathode impedance 15 should be many times the value of load impedance 23 for the reasons to be discussed in detail hereinafter.

An input circuit is connected from the grid 11 to the cathode 13, which circuit comprises the source 24 of a signal $e_1$ to be compared with a reference signal, potential source 16, and cathode impedance 15, the three elements being serially related in the input circuit.

Connected from cathode 13 to intermediate potential point 22 is a series circuit comprising a pair of asymmetrically conducting devices 17 and 18, having like electrodes connected at a common junction point 19, and a source 21 of the reference signal $e_2$. For a reason which will immediately become apparent, source 21 should preferably have a low internal impedance, for example, a battery if voltage $e_2$ is to be constant, or a cathode follower, if voltage $e_2$ is to be variable. An impedance 20 having substantially the same relative magnitude of impedance as impedance 15, is connected from the junction point 19 to the negative potential $V_1$ at a point between impedance 15 and potential source 16. This potential of $V_1$ and the polarity of devices 17 and 18 is such that major positive direct current will flow through device 18 when device 17 is non-conducting. This relation will immediately become more fully apparent.

It should be understood that in the present specification and in the appended claims, the term "asymmetrically conducting device" refers to any of the well-known devices which present a relatively low impedance to an applied voltage of one polarity and a very high impedance, i. e., many times the low impedance to an applied voltage of the opposite polarity, so that they permit substantial conduction in but one direction therethrough. Such devices are well known in the art and include, for example, germanium and silicon crystal rectifiers as well as the usual vacuum tube diodes. In the drawing, the usual convention is employed indicating by the direction of the arrowhead symbol the low impedance direction of positive current flow.

In Fig. 1, the reference voltage $e_2$ is, of course, isolated from the signal source $e_1$ by its position in the electrical circuit. The means for accomplishing this isolation is the circuit which connects the reference voltage $e_2$ between the device 18 and the ground or common point 22, and which is not coupled to receive energy either from the signal source $e_1$ or from the plate circuit of the vacuum tube.

The operation of the circuit of Fig. 1 and the manner in which this circuit will indicate whether the instantaneous amplitude of signal $e_1$ from source 24 is positive or negative with respect to the level of the instantaneous amplitude of signal $e_2$ from source 21 and will further indicate when the instantaneous amplitude of $e_1$ is equal to $e_2$, will most readily be understood if the following analysis of the circuit of Fig. 1 is considered in connection with the voltage and current versus time curves of Figs. 2A through 2F during an assumed cycle of operation.

As shown on Fig. 2A, the signal $e_1$ is represented, by way of example, as a periodically recurring saw-tooth wave. However, $e_1$ may be a wave form of any desired shape. The reference voltage $e_2$ is shown, by way of example, as a voltage wave of gradually decreasing amplitude, but it should be understood that the reference level voltage $e_2$ may be a voltage of periodically recurring amplitude, a voltage of constant amplitude, or, in many cases, it may be zero in which event the reference level would be that level of point 22. Of the remaining curves, Fig. 2B represents the voltage $e_c$ at cathode 13; Fig. 2C, the voltage appearing at junction point 19; Fig. 2D and Fig. 2E, the respective currents $i_1$ and $i_2$ through asymmetrically conducting devices 17 and 18; and Fig. 2F, the anode current $i_p$ flowing between cathode 13 and anode 12 and through load impedance 23.

When an amplifier circuit has a cathode impedance, such as 15 in Fig. 1, which is common to the grid or input circuit and to the plate or output circuit, negative or inverse feedback is developed across this cathode impedance from the output circuit to the input circuit. If the value of the cathode impedance is very large, the voltage of the cathode will follow very closely the voltage of the grid, and further, the plate current of the amplifier will be affected only slightly by changes in the grid voltage. Further if the plate load impedance 23 is small compared to the cathode impedance 15, the changes in voltage across the plate load resistance 23 will be small as compared with the changes in grid voltage. Such operation is now considered fundamental in vacuum tube amplifier theory, being that operation commonly exhibited by a cathode follower circuit.

Thus, in the circuit of Fig. 1, as the signal $e_1$ on the grid 11 increases in the manner shown by portion 27 on Fig. 2A, the voltage $e_c$ of cathode 13 will increase, following substantially the voltage on the grid 11. This is shown on Fig. 2B by the portion 32 of the characteristic. Because of the large amount of feedback due to the large impedance of 15, the current between anode 12 and cathode 13 will remain substantially unchanged, having only a slight slope as shown by portion 35 on Fig. 2F. The degree of slope may be made as small as desired by increasing the amount of negative feedback.

Pass for the moment to a consideration of the circuit including asymmetrically conductive device 18. Positive current assumed to have a value $i_1$, will flow from the positive terminal of source 16, through the low impedance voltage source 21, and through device 18 in the forward direction as indicated by the arrowhead. Since device 18 has a low impedance for this passage of current, junction point 19 will have substantially the voltage of $e_2$, each taken with reference to point 22. This value of junction point voltage is shown by portion 33 of the characteristic on Fig. 2C. Since the level of $e_1$ is negative with respect to the level of $e_2$, cathode 13 is negative with respect to junction point 19, and device 17 will be in its high impedance or low-conduction state. The non-conduction of device 17 is represented by portion 40 of the characteristic of Fig. 2E. Thus, the level of conduction between plate 12 and cathode 13 and through load impedance 23, designated $i_p$, is determined by the total circuit impedance of 23 and 15, and only to a small extent by the voltage $e_1$. In other words, the plate current $i_p$, as represented by portion 35 of Fig. 2F, is equal to $i_0$, the current through cathode impedance, and will increase only slightly from the normal zero grid signal current as voltage $e_1$ is increased.

With the assumed wave forms, voltage $e_1$ increases and voltage $e_2$ decreases as indicated by portions 26 and 27 of the characteristic of Fig. 2A. A point such as 31 on Fig. 2A, will eventually be approached at which the two voltages are equal. At this point, the potential of junction point 19 which has been following the voltage $e_2$ will be equal to $e_c$, the voltage of cathode 13, which has been following the voltage $e_1$, and device 17 will begin to conduct as indicated by the portion 38 of Fig. 2E.

When devices 17 and 18 are both conducting, a low impedance is placed in the cathode circuit of the amplifier, since conduction by both in effect shunts out the high impedance cathode resistance 15. This reduces the negative feedback, which will be reduced to a minimum when both devices are conducting equally, and places the amplifier in a high gain condition. Since any increase in the amplitude or level of a signal $e_1$ on grid 11 must then cause an increase in the current $i_p$, the additional current will be drawn through resistances 20 and 17. Now the current $i_p$ is equal to the sum of $i_0$ and the current $i_2$ through device 17. This results in a rapid transfer of the current flowing through resistance 20 from the path through device 18 to the path through device 17. The transfer is shown by portions 37 and 38 of the characteristics of Fig. 2D and Fig. 2E, respectively.

Junction point 19 is now effectively connected to cathode 13 through the low impedance of device 17. As the level of $e_1$ becomes positive with respect to the level of $e_2$ as indicated by portions 28 and 29, respectively, of the characteristics of Fig. 2A, point 19 becomes positive with respect to the level of $e_2$. Thus, this potential applied across device 18 renders it a high impedance or places it in a low-conduction state.

Further, since point 19 is effectively connected to cathode 13 through device 17, the cathode impedance of the amplifier now comprises the parallel combination of impedance 15 and impedance 20. The amplifier is therefore conducting with an increased current $i_p$ now equal to the current $i_0$ formerly flowing through the cathode impedance 15 plus the additional current $i_2$ now flowing through the shunt impedance 20 and device 17. This increased value of $i_p$ is represented by portion 41 of the characteristic of Fig. 2F.

Since the value of parallel combination of impedance 15 and impedance 20 is still large, there is again a large amount of negative feedback, and there will be no further substantial change in the current flowing through load impedance 23 so long as the level of signal $e_1$ remains more positive than the level of the reference signal $e_2$. Furthermore, since the load impedance 23 is small in comparison with the cathode impedance 15, the change in plate voltage will be small as compared with changes in grid voltages.

This then is a second state of operation of the circuit shown in Fig. 1. It is a stable state determined by a level of conduction which will remain substantially constant so long as the level of $e_1$ is more positive than the level of the reference signal $e_2$.

If the level of signal $e_1$ becomes negative with respect to the level of the reference signal $e_1$, the circuit of Fig. 1 will return to the first state of operation already described. Since the transfer from the second state to the first state is substantially the converse of the transfer from the first state to the second state analyzed above, it is deemed only necessary to briefly state this converse operation.

As the potential of signal $e_1$ decreases and approaches equality with reference level $e_2$, device 18 begins to conduct as indicated by portion 44 of Fig. 2D. When the two potentials are of equal level, devices 17 and 18 will conduct equally. Negative feedback is reduced to a minimum and current will be effectively transferred from the path through device 17 to the path through device 18. When the level of the reference voltage $e_2$ is more positive than the level of the signal $e_1$, the junction point 19 will be at the level of $e_2$. Device 17 will have a high impedance since point 19 is more positive than cathode 13, and impedance 15 will provide the only effective conduction path in the circuit of cathode 13. Thus the current $i_p$ through the output circuit and through load impedance 23 will be equal to $i_0$, which was the conduction level of the first state above identified.

It should be noted that transfer from one state to the other occurs when the voltage of cathode 13 and the level of reference voltage $e_2$ are equal. This consideration prevails regardless of whether the potential of $e_1$ with respect to that of $e_2$ is becoming more positive or more negative.

If the reference signal $e_2$ is zero, in other words, if device 18 is connected directly to point 22, transfer from one state into the other would occur when the level of input signal $e_1$ passes through ground potential or the potential of reference point 22.

It should be further noted that the range through which signal $e_1$ may vary with respect to the level of point 22 is limited in the negative direction by the magnitude of $V_1$, the potential of source 16. For this reason $V_1$ is made sufficiently large, 300 volts will be satisfactory in most applications, to allow a substantial permissible negative value of signal $e_1$. However, if the desired range of signal $e_1$ includes only levels positive with respect to point 22, the source 16 may be omitted.

In Fig. 3A the above-described conditions are generalized and represented in a form which will be convenient for use in the development of the embodiments to be described hereinafter. The abscissa of the characteristic shown in Fig. 3A represents voltage while the ordinate represents current. The voltage level of signal $e_1$ is shown increasing to the right from a voltage $V_1$ representing the potential of source 16. At some point along this abscissa is indicated the reference voltage $e_2$.

The current $i_0$ flowing through cathode impedance 15 and the sum current of $i_0$ and $i_2$, current $i_2$ being that current flowing in the low impedance direction through device 17, are represented by the broken line characteristics of Fig. 3A. The anode current $i_p$ is represented by the solid line characteristic of Fig. 3A. In the region in which $e_1$ is greater than $e_2$, the anode current $i_p$, as shown by portion 46, is equal to $i_0$. In the region in which $e_1$ is greater than $e_2$, the anode current $i_p$, as shown by portion 47, is equal to the sum of $i_2$ and $i_0$. The transition portion 48 occurs during that period in which the level of $e_1$ is equal or substantially equal to the level of $e_2$.

The resulting input versus output characteristic is shown in generalized form in Fig. 3B, which has the same abscissa as Fig. 3A but in which the ordinate represents voltage. The anode voltage, which is the output signal taken as illustrated in Fig. 1 across the entire anode load comprising both impedance 23 and potential source 14, is shown as the solid line characteristic. The voltage $V_2$ of potential source 14 is indicated at a point on the ordinate scale. In that region in which $e_1$ is less than $e_2$, the output voltage is maximum, as indicated by portion 56 of the characteristic since current through impedance 23 is minimum. When $e_1$ is greater than $e_2$, the output voltage is minimum, giving the second state as represented by portion 57 of the characteristic, since current through impedance 23 is maximum. The transition portion 58 of the characteristic occurs during the period that the level of $e_1$ is equal or substantially equal to the level of $e_2$.

Further consideration of the particular slopes of the characteristic on either side of the transition portion in Figs. 3A and 3B will be reserved for treatment hereinafter with reference to Figs. 8 and 9.

It is apparent that an output signal of opposite phase would be obtained across impedance 23 alone. Further since the two states of operation of the multistate device are actually two levels of conduction through the anode circuit, it is also apparent that the output circuit may be such as to utilize the change in current directly, as for example, by including a relay or other current sensitive device either in place of or in series with load impedance 23.

Figure 4:
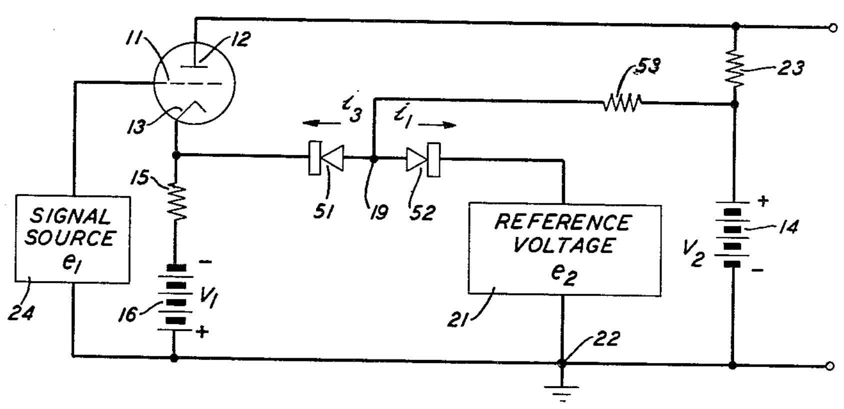

In Fig. 4 a second embodiment in accordance with the invention of Fig. 1 is shown in schematic diagram form, which is basically the same as the circuit of Fig. 1. For this reason, corresponding reference numerals have been used to designate corresponding components. Modification will be seen from a comparison of Fig. 4 with that of Fig. 1, to reside in the reversed polarity of the asymmetrically conducting devices, now numbered 51 and 52, and in the fact that the impedance 53, connected at junction point 19 between the devices 51 and 52, is returned to a positive potential at a point between load 23 and potential source 14. The relation between the potential to which impedance 53 is returned and the polarity of devices 51 and 52 remains such as to cause major positive direct-current flow through device 52 in the forward low impedance direction thereof when device 51 is in a non-conducting or high impedance state.

Aided by the background afforded by the foregoing detailed discussion of the operation of the multistate device of Fig. 1, the operation of the circuit of Fig. 4 may be understood without extensive analysis. Thus when the voltage $e_1$ from source 24 is greater than the voltage $e_2$ from source 21, device 52 will conduct positive current from the positive terminal of source 14, which current passes through the high impedance of 53 and the low impedance of source 21, to the negative terminal of source 14. Thus junction point 19 will have substantially the same level of voltage as $e_2$. Since cathode 13 has substantially the same level of voltage of $e_1$, device 51 will be in its high impedance or nonconducting condition.

Therefore a first state of the multistate device of Fig. 4 is determined by a first level of conduction between cathode 13 and anode 12, which level is assumed by the amplifier independent of any shunting effect of devices 51 and 52. Because of the large amount of negative feedback, this level of conduction remains substantially constant regardless of any change in the level of signal $e_1$. This is true so long as the level of $e_1$ is greater than that of $e_2$.

When the level of the signal $e_1$ is equal to the level of the signal $e_2$, devices 51 and 52 will conduct equally, which will, in the manner already described, place the amplifier in a condition of high gain by decreasing the negative feedback. Current flowing from source 14 through impedance 53 will transfer from device 52 to device 51. As the level of $e_1$ becomes lower than the level of $e_2$, current transfer becomes complete, and device 52 will assume a high impedance non-conducting state. Junction point 19 will have substantially the potential level of cathode 13 since device 51 is conducting in its low impedance condition.

Thus impedance 53 is effectively connected to shunt with the space current path between cathode 13 and anode 12, which means that the current flowing in cathode impedance 15 is made up of the sum of the space current of the amplifier and the current flowing through impedance 53 and device 51. Because of the cathode follower type action of the circuit, however, the potential of cathode 13 cannot rise above the level of $e_1$. In order to fulfill this condition the circuit must maintain a constant current through impedance 15 by providing a decrease in the space current between cathode 13 and anode 12 equal to $i_3$, the current conducted by device 51.

Therefore a second state of the multistate device is obtained determined by a second level of conduction between cathode 13 and anode 12. This second level is lower than the first level by the amount of conduction of device 51. Due to the present large amount of negative feedback, this second level also remains substantially constant regardless of any change in the level of signal $e_1$ so long as the level of $e_1$ is less than that of $e_2$.

Figure 5A:
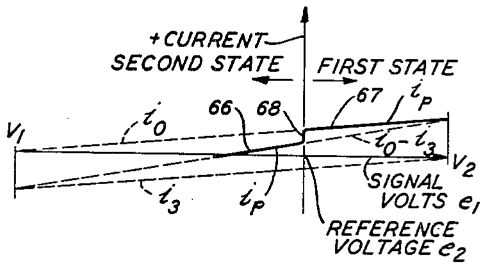

In Fig. 5A these conditions of operation are conveniently represented in a generalized form similar to Fig. 3A. In Fig. 5A, the abscissa represents voltage while the ordinate represents current. The current $i_0$, that is the current which flows through load impedance 23 when device 51 is non-conducting and no shunt path is provided around the space current path of the amplifier, is shown slightly increasing with increasing signal voltage $e_1$. The current $i_3$, which is that current conducted by the path comprising impedance 53 and device 51, when the latter is in its low impedance condition, is shown as a negative current which slightly decreases as the signal voltage $e_1$ increases. Current $i_3$ is shown as negative since it is in effect subtracted from the current $i_0$ when device 51 conducts. The resulting difference, that is $i_0-i_3$, is therefore the graphical sum of the characteristic $i_0$ and $i_3$.

When the signal $e_1$ is less than the reference level $e_2$, i. e., the second state defined above, the anode current $i_p$ which flows through impedance 23, indicated by the solid line characteristic on Fig. 5A, is equal $i_0-i_3$ as shown by portion 66. In that region in which $e_1$ is greater than $e_2$, i. e., the first state defined above, the anode current $i_p$ is equal to $i_0$, as shown by portion 67 of the characteristic of Fig. 5A. The transition portion 68 occurs during that period in which the level of $e_1$ is equal or substantially equal to the level of $e_2$.

Figure 5B:
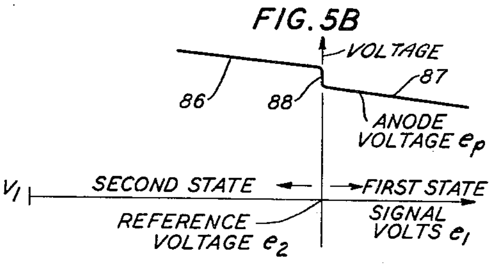

The resulting input versus output characteristic is shown in Fig. 5B, which is seen to be similar to Fig. 3B. In that region in which $e_1$ is less than $e_2$, the output voltage is maximum as indicated by portion 86, representing the second state defined above, since current through impedance 23 is minimum. Where $e_1$ is greater than $e_2$, the output voltage is minimum, giving the first state of operation of the circuit of Fig. 4 as represented by portion 87 of the characteristic. The transition portion 88 of the characteristic occurs during the period that the level of $e_1$ is equal or substantially equal to the level of $e_2$.

Further consideration of the particular slopes of the characteristics on either side of the transition portion of Figs. 5A and 5B will be reserved for treatment hereinafter with reference to Figs. 8 and 9.

In Figs. 2D, 2E, and 2F, the transition region, indicated therein by portions 37, 38, 39, respectively, of the characteristics, have been exaggerated to some extent for the purpose of illustration of the exact manner in which the invention operates. If the asymmetrically conducting devices were theoretically perfect there would be no transition region, i. e., the transfer of current from one device to the other would occur with an infinitesimal increment of input voltage. With the presently known asymmetrically conducting devices, however, it is necessary for the signal voltage $e_1$ to change several volts relative to the reference level $e_2$ in order to cause a complete transfer in current from one device to another.

When the entire characteristic of the multistate device is considered, as for example, in Figs. 3 and 5, the increment of voltage determining the transition region is so small in comparison to the increment of the states of conduction on either side of the transition region, as to be practically negligible. In many applications this is all that is desired since interest is principally centered upon the conduction occurring during either one of the other of the states without regard to the transition period.

In those applications in which it is desirable for the transition region to be substantially non-existent, the increment of input voltage necessary to cause a complete change of state may be reduced by either of the modifications of the circuits of Figs. 1 and 4 to be now described in connection with Figs. 6 and 7. In both embodiments the transition region is decreased by an application of positive regeneration during a portion or all of the instant of state transfer.

Figure 6:
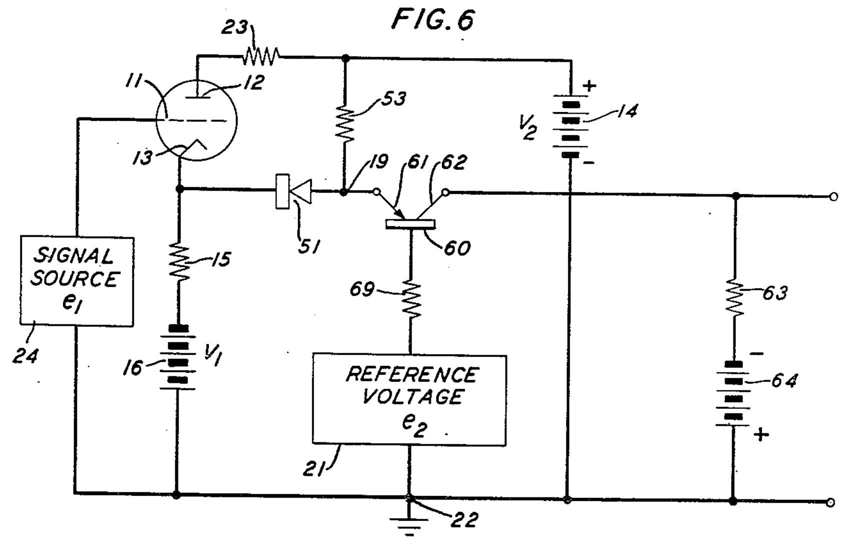
Fig. 6 shows in electrical schematic diagram form a modification of the multistate device of Fig. 4 in accordance with a subsidiary object of the invention.

In the particular embodiment of Fig. 6, positive regeneration is obtained by utilizing the negative resistance effect of certain semiconductors in the manner to be described. The circuit modification as shown in Fig. 6 in schematic diagram form is identical in many of its details to the circuit of Fig. 4. For this reason, corresponding reference numerals have been used to designate corresponding components.

Positive regeneration is obtained in the multistate device of Fig. 6 by substituting a "transistor" comprising a base element 60, an emitter electrode 61 and a collector electrode 62, and a base circuit impedance 69, in place of asymmetrically conducting device 52 of Fig. 4. Emitter electrode 61 is connected to junction point 19, and base element 60 is connected through impedance 69 to source 21 of reference level voltage 21.

A suitable transistor is disclosed in an article "The Transistor, a Semiconductor Triode" by J. Bardeen and W. H. Brattain, Physical Review, volume 74, page 230, July 15, 1948. There is disclosed a unit comprising a small block of semiconductor material, such as N-type germanium, with which are associated three electrodes. One of these, known as the base electrode, makes low resistance contact with a face of the block and may be a plated metal film. The others termed emitter and collector, respectively, preferably make rectifier contact with the block as point contacts.

The device may take various forms of which examples are disclosed in an application of J. N. Shive, Serial No. 44,241 filed August 14, 1948, now Patent No. 2,691,750, granted October 12, 1954, and an application of W. E. Kock and R. L. Wallace, Jr., Serial No. 45,023, filed August 19, 1948, now Patent No. 2,560,579, issued July 17, 1951. The device in all its forms has received the appellation "Transistor," and will be so designated herein.

The emitter section comprising element 61 and base 60 is biased by potential source 14 for major positive current flow in the forward direction as indicated by the arrowhead symbol on the schematic representation of the device, which current will flow when device 51 is in a nonconducting or high impedance state. The collector section comprising electrode 62 and base 60 is biased by source 64 through load impedance 63 for major current flow from base 60 to collector electrode 62. Thus the negative terminal of source 64 is connected through impedance 63 to collector electrode 62.

It should be apparent that the emitter section including electrode 61 and base 60, neglecting for the moment any effect due to the collector section of the transistor, will perform as an asymmetrically conducting device in identical fashion to the asymmetrically conducting device 52 of Fig. 4. Thus neglecting the effect of the collector section and its associated components, the multistate device of Fig. 6 will function, in so far as its remaining components are concerned, in the same manner as the multistate device of Fig. 4. Point 19 of Fig. 6 is, therefore, the junction point of the like terminals of the two asymmetrically conducting devices.

However, it is a general property of all transistors fabricated that increments of signal current which flow in the circuit of the collector electrode as a result of the signal current increments which flow in the circuit of the emitter electrode may exceed the latter in magnitude. The ratio of this current gain has been designated by "$\alpha$" for zero impedance conditions in the external emitter and collector circuits. Where these external circuits are not zero the current gain is designated by "$\alpha'$."

In the copending application of A. J. Rack, Serial No. 79,861, filed March 5, 1949, it is shown that if the base circuit impedance such as 69 is sufficiently large compared to the load impedance 63 of the transistor circuit, the value of $\alpha'$ can exceed unity by a sufficient margin so that the collector current will substantially exceed the emitter current which gave rise to it. Thus a part of the collector current is in effect fed back to the emitter in proper phase to increase the emitter current originally introduced, thus giving rise to regeneration.

As soon, however, as the positive or regenerative feedback current begins to flow, the transistor operating conditions are altered by reason of the alteration of the electrode currents. This alteration carries the operating conditions into a domain in which the current amplification $\alpha'$ no longer exceeds unity by sufficient margin to maintain feedback. Such a domain is stable. There are two stable domains, one on either side of the unstable domain, and the transistor proceeds from the unstable domain to one of the stable domains or to the other, in dependence on the direction of change of the initial emitter current. There it will remain until some disturbance drives it back into the unstable domain. In one domain the emitter circuit is in a condition of low current conduction and in the other in a condition of high current conduction. Thus a disturbance tending to decrease the emitter current will drive the transistor into the domain of low conduction and a disturbance of the opposite polarity will drive the transistor into a domain of high conduction. This operation, the mathematical parameters which underlie the operation and the detailed consideration are treated fully in the above-identified Rack application, and more particularly therein with reference to Figs. 15 and 16 of said application.

Thus in the multistate device of Fig. 6 when $e_1$ is greater than $e_2$, positive current will flow from source 14, through impedance 53, through the emitter section of the transistor which is now in the domain of high conduction, and through impedance 69. As $e_1$ approaches the level of $e_2$ some current will transfer from this path to the path through device 51 necessarily decreasing the current through the emitter section of the transistor. Due to the regenerative action described above, the transistor will suddenly snap to the domain of low conduction between the emitter 61 and base 60, forcing a sudden transfer of substantially all the current to the path through device 51. When $e_1$ again becomes greater than $e_2$ the converse action will take place as a small increase in the current through the path of emitter 61 and base 60 will cause this path to suddenly assume full conduction.

Now, since the threshold at which the transistor will assume full conduction in response to a small increase in emitter current, and the threshold at which the transistor will assume non-conduction in response to a small decrease in emitter current are determined by the relative values of the impedance in the base circuit (impedance 69) and in the emitter circuit (impedance 53 when 51 is non-conducting or impedance 53 in parallel with impedance 15 when 51 is conducting) in the manner taught in said Rack application, it is possible to obtain a hysteresis effect in the input versus output characteristic of the multistate device. In other words, the change from the first state to the second state may be adjusted to occur only after the signal voltage has become less than the reference voltage by a predetermined amount while the change from the second state to the first state may be adjusted to occur only after the signal voltage has become greater than the reference voltage by a predetermined amount.

As the magnitude of the base impedance 69 is decreased, a condition of operation will be reached in which the current amplification factor $\alpha'$ will never actually exceed unity. The above-defined definite stable and unstable domains will no longer exist, but rather the emitter section will change evenly, although still in response to a small increment of input voltage, from a condition of low impedance of one of high impedance, and conversely, from a condition of high impedance to one of low impedance. The above-described hysteresis effect is no longer present, but rather the change from one state to the other of the multistate device will take place in both directions when the signal $e_1$ passes through a given level, related by a small fixed amount to the reference level $e_2$.

Figure 7:
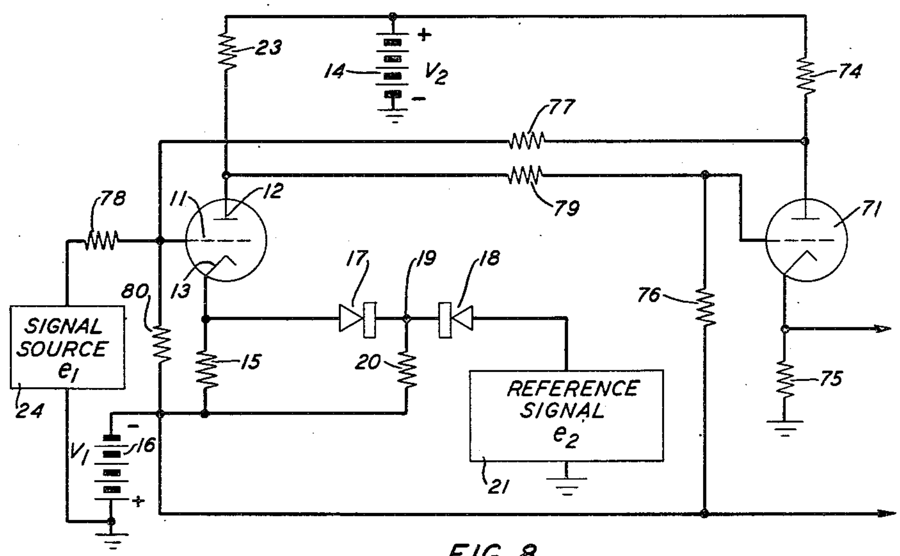
Fig. 7 shows in electrical schematic diagram form an alternative to the modification of Fig. 6 in accordance with the invention.

In Fig. 7, an alternative embodiment to that of Fig. 6 is shown, in which positive feedback is employed to produce positive regeneration in order to decrease the increment of input voltage necessary to cause a complete change from one state to another.

A portion of the voltage appearing at anode 12 is coupled through impedance 79, which impedance is very large relative to anode impedance 23 so that this coupling is effective substantially only for voltage, to the grid of tube 71. An impedance 76 of size comparable in size to impedance 79 completes the coupling path to the negative potential of source 16. Thus the operating bias potential of the grid of tube 71 is substantially ground potential.

A feedback path is provided from the plate of tube 71 to grid 11 by the impedance network comprising impedances 77, 78 and 80, which impedances are large, being of the same relative magnitude as impedances 79 and 76, respectively, in order that the feedback will be substantially of voltage. The feedback will be seen to be positive or in the same phase as an initial signal on grid 11 since an even number of phase reversals are encountered around the feedback loop.

In accordance with the usual principles of positive feedback, the maximum loop gain for direct-current or at zero frequency is adjusted to be substantially unity when both asymmetrical devices 17 and 18 are equally conducting. Since this is the condition of minimum cathode impedance in the multistate device, it is the condition of maximum gain between grid 11 and anode 12. Thus when either one or the other of devices 17 and 18 is alone conducting, the total loop gain will be less than unity.

Under these conditions stable operation of the multistate device of Fig. 7 is obtained during the transition region. Every increment of change in the voltage $e_1$, coupled from source 24 through resistor 78 to grid 11, is reenforced by the feedback voltage. Of course this action is accummulative so that only a small increment of input voltage $e_1$ in the region of reference level $e_2$ is required to complete transfer of current from one asymmetrical device to the other, thereby completing the change from one state of operation to the other.

If the maximum loop gain when both devices 17 and 18 are conducting equally is adjusted to be greater than unity, a hysteresis of the type found under certain of the conditions described with reference to Fig. 6 may also be obtained in the multistate device of Fig. 7. This will be apparent to one skilled in the feedback art when it is recalled that the circuit will pass from a stable domain, existing when only one asymmetrical device is conducting, into an unstable domain, when the loop gain exceeds unity, and into a second stable domain when the loop gain is again less than unity. In order to switch back into the first stable domain an increment of input signal is required sufficient to exceed the reference bias plus the additional bias resulting from the positive feedback voltage.

The output signal of the circuit of Fig. 7 may be taken across impedance 74, but it is usually preferable to take the output signal across a cathode impedance 75 as illustrated in Fig. 7. The latter connection prevents loading the feedback circuit and eliminates the possibility of original signal voltages being fed in the reverse direction through the feedback coupling and appearing in the output.

Figure 8:
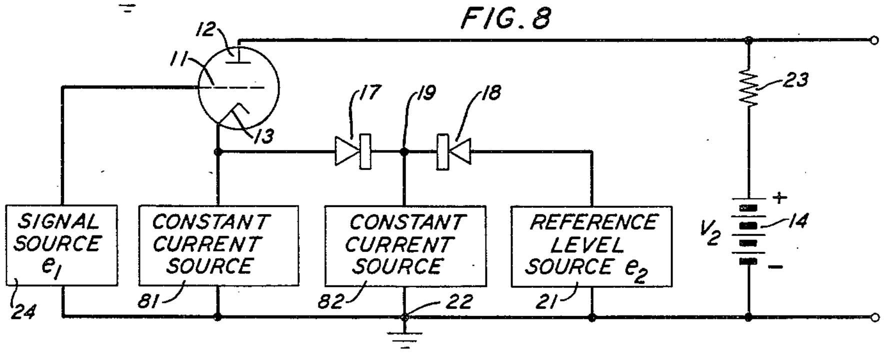
Fig. 8 shows in electrical schematic diagram form a modification of the multistate device of Fig. 1 in accordance with a further subsidiary object of the invention.

In Fig. 8, an additional refinement in accordance with a feature of the invention is shown whereby the slight slopes of the portions of the characteristics of the first and second states on either side of the transition region may be eliminated. Referring again for the moment to Fig. 3A, it is seen that portion 46, which represents the level of conduction on the current $i_p$ in the first state of the multistate device of Fig. 1 increases slightly as the signal $e_1$ increases. This slope is magnified in Fig. 3A for illustration since, as the result of the large amount of negative feedback, the value of $i_0$, which is equal to $i_p$ over portion 46, is substantially constant over any practically useful range of the signal $e_1$.

In addition to negative feedback in the circuit of Fig. 1, a further tendency maintaining $i_0$ constant is found in the fact that the impedance of 15 is of large magnitude and that the potential of source 16 is large. Such a series combination of a large voltage source and a high impedance has many of the qualities of a constant current source even though as such it is not perfect.

In Fig. 8, a constant current source 81 replaces the imperfect constant current combination of impedance 15 and source 16 of Fig. 1. Source 81 may be any of the well-known constant current devices. For example, a pentode or a saturated diode either of which draw nearly constant current for different values of applied voltage would be satisfactory. A more elaborate constant current source, as disclosed in the copending application of L. A. Meacham for Current Regulation, Serial No. 21,651, filed April 17, 1948, now Patent No. 2,607,030 issued August 12, 1952, may be used. Other known constant current sources may also be substituted by those skilled in the art.

In similar fashion, a second constant current source 82 is located in the circuit of Fig. 8 to supply the current flowing through either device 17 or device 18 at junction point 19. Thus, source 82 is seen to replace the impedance 20 in Fig. 1.

As shown in the circuit of Fig. 8, source 81 will regulate the current $i_0$, as represented in Fig. 3A, to a constant value regardless of the magnitude of the signal $e_1$. This means that there will be no slope in portion 46 of the characteristic of Fig. 3A and, therefore, no variations in the level of conduction of the first state of the device of Fig. 8. Source 82 will regulate the current $i_2$, as represented in Fig. 3A, also to a substantially constant value, thereby eliminating all slope from the portion 47 of the characteristic of Fig. 3A and all variation in the level of conduction during the second state of the multistate device of Fig. 8. The remaining components of Fig. 8 are identical to those described in connection with Fig. 1.

Figure 9:
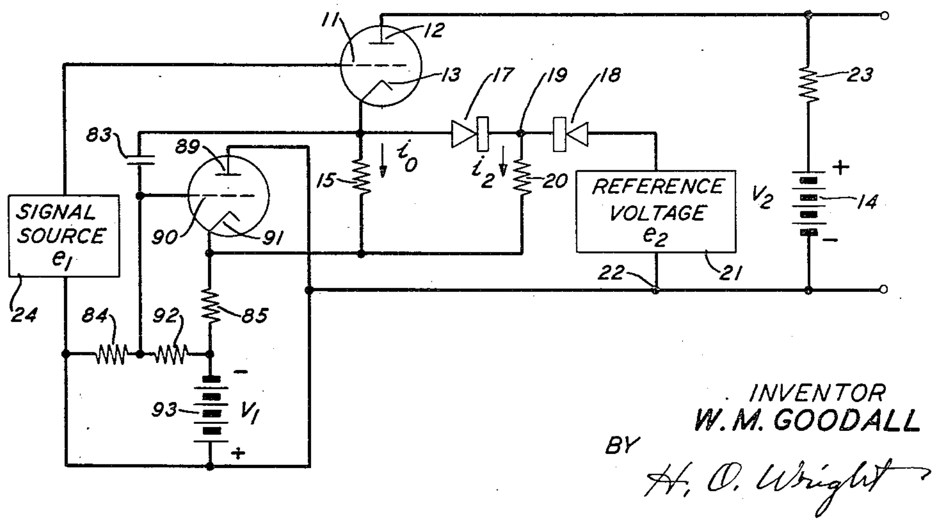
Fig. 9 shows in electrical schematic diagram form an alternative configuration to the modification of Fig. 8.

In Fig. 9, a further refinement in accordance with a feature of the invention is shown, in which the currents $i_0$ and $i_2$ are maintained constant in order to eliminate the slopes of the portions of the characteristics of the first and second states on either side of the transition region. This is accomplished by a novel circuit arrangement which maintains the currents $i_0$ and $i_2$ through impedances 15 and 20, respectively, substantially constant by maintaining the voltage drop thereacross substantially constant.

Comparison of the circuit of Fig. 9 with the basic circuit of Fig. 1 will indicate that all elements of Fig. 1 have been retained and given corresponding reference numerals with the exception of the negative potential source 16. In place thereof has been substituted the current regulating circuit to be described.

A thermionic vacuum tube having at least an anode 89, a control grid 90, and a cathode 91 has been connected in the familiar cathode follower circuit. A cathode impedance 85 and a source of potential 93 are connected in the order named from cathode 91 to anode 89, source 93 having the positive terminal thereof connected directly to anode 89 and to intermediate potential point 22. Direct-current bias for grid 90 is supplied by the bleeder combination of large magnitude resistors 84 and 92 connected across source 93. The lower terminals of impedances 15 and 20 are connected directly to cathode 91, and the upper terminal of impedance 15 is connected through condenser 83 to grid 90. The time constant of condenser 83 in combination with the bias circuit 84 and 92 should be long compared to the period of the signal $e_1$.

Thus, when the voltage level of cathode 13 varies in response to the level of signal $e_1$ in the manner already described, this variation is applied between the grid 90 and reference point 22. Since the tube in combination with cathode impedance 85 acts as the familiar cathode follower circuit, such current will be drawn through impedance 85 as to cause the potential of cathode 91 to follow the periodic variations of the grid 90. Therefore, the level of the lower termination of impedance 15, so far as the alternating-current component of the level is considered, will at all times be substantially equal to the level of the alternating-current component of the upper terminal thereof or to the alternating component of the level of cathode 13 in spite of the periodic variations of the signal $e_1$. Since the voltage across impedance 15 is thereby held constant, the current $i_0$ therethrough will be constant, and so also, when device 17 is conducting will the current $i_2$ be constant. The voltage changes of cathode 13 or junction point 19 with respect to intermediate point 22, which are necessary to cause devices 17 and 18 to assume conduction or non-conduction in the manner described, will still occur, this change in voltage appearing across impedance 85.

In view of the foregoing, it should be apparent to those skilled in the art that a similar substitution of constant current sources may be made in the multistate device of Fig. 4.

Figure 10:
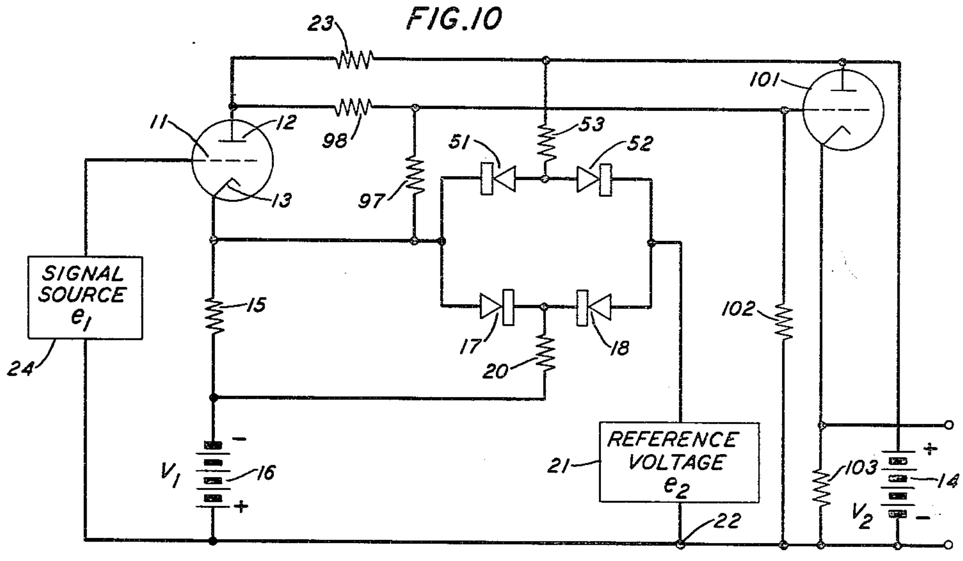
Fig. 10 is a composite multistate circuit which includes features shown in the circuits of Figs. 1 and 4.

In Fig. 10, an alternative embodiment to the constant current embodiment shown in Fig. 8 is illustrated, whereby the slopes of the portions of the characteristics of the first and second states on either side of the transition region is eliminated. Basically, the circuit of Fig. 10 is an unusual and novel combination of the principles of the two multistate circuits already described in Fig. 1 and in Fig. 4. As will be seen, the circuit of Fig. 10 includes the two serially-related and oppositely poled asymmetrically conducting devices 17 and 18 of Fig. 1, having their common junction point returned through impedance 20 to the negative potential of source 16, and also, the two symmetrically conducting devices 51 and 52 of Fig. 4, having their common junction point returned through impedance 53 to the positive potential of source 14.

In addition there is included in the circuit of Fig. 10, a coupling connection comprising impedance 98 from anode 12 to the grid of an ordinary cathode-follower stage comprising tube 101, and a coupling connection comprising impedance 97 from cathode 13 to the grid of tube 101. A grid impedance 102 is provided from the grid of 101 to the reference level of point 22. The output signal is taken across cathode impedance 103 of tube 101.

Figure 11A:
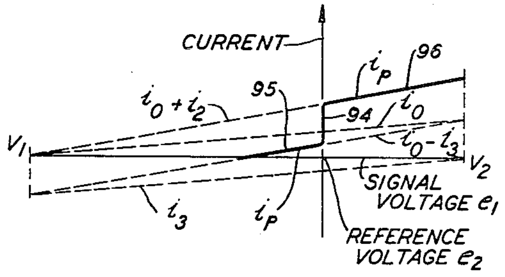
Figs. 11A and 11B, given by way of illustration, are generalized current and voltage characteristics, respectively, of the multistate device of Fig. 10.
Figure 11B:
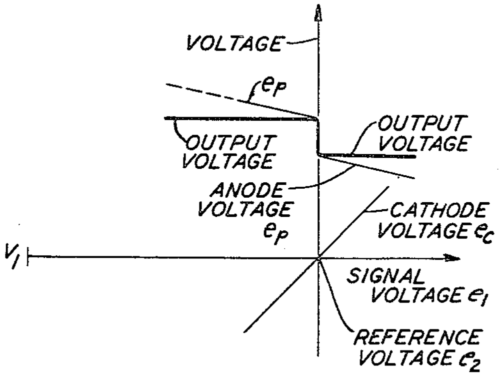

The operation of the multistate circuit of Fig. 10 and the proper proportions of the components thereof desirable to obtain this operation, will be readily understood from the following analysis of Fig. 10, taken in connection with the electrical characteristic representation thereof of Figs. 11A and 11B.

Fig. 11A is in effect a superposition of Fig. 3A upon Fig. 5A. Thus the various independent currents hereinbefore discussed are shown on Fig. 11A by the broken line characteristics. For example, the negative of the current $i_3$ which passes through device 51 in its low impedance condition is shown decreasing as signal $e_1$ increases. The current $i_0$, which passes through load impedance 23 when no shunt path is provided around the amplifier is shown increasing with an increase in $e_1$. The current $i_0+i_2$, $i_2$ being that current which passes through device 17 in its low impedance condition, is shown increasing with an increase in $e_1$.

In that region in which the signal $e_1$ is less than the reference level $e_2$, devices 51 and 18 only will conduct in their low impedance direction for the reasons already given in detail hereinbefore. Thus the anode current $i_p$ flowing through impedance 23 indicated by the solid line characteristic of Fig. 11A will equal $i_0-i_3$, as shown by portion 95 of the characteristics of Fig. 11A, and will provide a first level or conduction and therefore a first state of operation of the multistate device of Fig. 10.

In that region in which the signal $e_1$ is greater than the reference level $e_2$, devices 52 and 17 only will conduct in their low impedance direction for the reasons already given in detail. Thus the anode current $i_p$ will now be equal to $i_0+i_2$, as shown by portion 96 of the characteristic of Fig. 11A, and will provide a second level of conduction and therefore a second state of operation of the multistate device of Fig. 10.

The portion 94 of the characteristic of Fig. 11A indicates the transition region which occurs when the signal $e_1$ is substantially equal to the reference level $e_2$.

Several important features should be noted concerning the characteristics of the circuit thus far described. First, the difference in the level of conduction between the first state and the second state is now substantially twice the corresponding difference in either the circuit of Fig. 1 or Fig. 2. Secondly, the slope of portion 95 will be identical to the slope of portion 96 so long as the symmetrical characteristics of devices 51, 52, 17 and 18, and the equality of impedances 53 and 20 are maintained. Reference to the characteristics of Figs. 3A and 5A will indicate that this was not there the case but rather, that the slope of the first level of conduction was different from the slope of the second. The advantages gained by the equality of slope shown on Fig. 10A will be immediately shown.

In Fig. 11B, the voltages appearing at the cathode 13, the anode 12, and the output voltages from cathode follower 101 are shown as they relate to the signal voltages $e_1$ of the multistate device of Fig. 10.

The anode voltage $e_p$ is of course the converse of the anode current characteristic $i_p$ of Fig. 11A. Thus the anode voltage is high in the first state of operation and low in the second state of operation. In both states the characteristic has a constant slope equal to the anode gain. In terms of the values of the impedance of the circuit of Fig. 10, this slope is substantially equal to the value of impedance 23 divided by the value of the parallel combination either of impedance 15 and impedance 53 when device 51 is conducting, or of impedance 15 and impedance 20 when device 17 is conducting. Since the relative magnitudes of these impedances are chosen so that impedance 23 is small compared to either 20 or 53, and so that impedances 20 and 53 are substantially equal, the slope of the $e_p$ characteristic is small and equal in both states.

The cathode voltage $e_c$ is approximately equal to the voltage $e_1$ and therefore has a slope of unity, or more specifically a slope equal to the cathode gain which is substantially unity. The slopes of $e_c$ and $e_p$ are of opposite phase, i. e., $e_c$ is of negative slope and $e_p$ positive.

Therefore, in accordance with one feature of the invention, a portion of the signal $e_p$, taken across impedance 102 of the voltage divider circuit comprising impedances 102 and 98, and a portion of the signal $e_c$, taken across impedance 102 of the voltage divider circuit comprising impedances 102 and 97, are combined in the cathode follower 101, so that the slope of the resulting output signal taken across impedance 103 is zero. These portions are properly determined when the ratio of impedance 98 to impedance 97 is equal to the ratio of impedance 23 to the impedance of the parallel combination of impedance 15 with either impedance 53 or impedance 20. These relations are readily seen upon an examination of the characteristics of Fig. 11B.

Although the invention has been illustrated and described herein in terms of separate embodiments and separate modifications of these embodiments, it should be apparent that one or more of the modifications may be included in the same multistate device, and probably would be when the most perfect form of the invention is to be employed. For example, one such inclusive circuit would be the embodiment of Fig. 10 modified in accordance with either the teachings of Figs. 6 or 7 to obtain a substantially instantaneous transfer of states of operation. Another suitable inclusive circuit would be the embodiment of Figs. 1 or 4, modified in accordance with the teachings of Figs. 8 or 9 and also in accordance with the teachings of either Figs. 6 or 7. Other such circuits including one or more of the specific improvements in accordance with the subsidiary objects will occur to those skilled in the art.

In all events it is to be understood that the above-described arrangements are illustrative of the application of the principles of the invention. Numerous other arrangements may be devised by those skilled in the art without departing from the spirit and scope of the invention.

What is claimed is:

1. In combination, a thermionic tube having at least a plate and a cathode and a grid, an output circuit connected between said plate and said cathode, a load impedance and a multipotential source of direct-current and a cathode impedance serially included in said output circuit, a circuit connected from said cathode to an intermediate potential point on said multipotential source, said last-mentioned circuit including a pair of asymmetrically conducting devices having like electrodes connected together, one of said devices being located nearer to said cathode in said circuit than the other of said devices and the other of said devices being serially connected with said one device in said circuit, a source of reference potential connected in said circuit between said multipotential source and said other device, a direct-current path including an impedance connected from a point between said pair of devices to a point in said output circuit, the potential of said last-named point relative to said intermediate potential point causing major direct-current to flow through said other device when said one device is non-conducting, a signal voltage input circuit connected from said grid to said intermediate potential point, and means for substantially isolating said source of reference potential and the circuit connecting it to said other device from signals applied to said input circuit.

2. In combination, a thermionic tube having at least a plate and a cathode and a grid, an anode circuit connected between said plate and said cathode, a load impedance and a multipotential source of direct-current and a cathode impedance serially included in said anode circuit, a voltage input circuit connected from said grid to said cathode and including said cathode impedance, a circuit connected from said cathode to an intermediate potential point on said multipotential source, said last-mentioned circuit including two pairs of asymmetrically conducting devices having like electrodes connected together, one of the devices of each of said pairs being located closer to said cathode in said circuit than the other of said devices in each pair and the other of said devices in each pair being serially connected with the one device of each pair, said one device of each pair having unlike terminals connected together and a direct-current path for each pair including an impedance connected from the points between the devices of each pair to points in said anode circuit, the potential of each of said last-named points relative to said intermediate potential point being such as to cause major direct-current to flow through said other device of each pair when said one device of said pair is non-conducting.

3. In combination, a thermionic tube having at least a plate and a cathode and a grid, a voltage input circuit connected from said grid to said cathode, an anode circuit connected between said plate and said cathode, and a multipotential source of direct-current included in said anode circuit, a circuit connected from said cathode to an intermediate potential point on said multipotential source, said last-mentioned circuit including two parallel pairs of asymmetrically conducting devices having like electrodes connected together, one of the devices of each of said pairs being located closer to said cathode in said circuit than the other of said devices in each pair and the other of said devices in each pair being serially connected with the one device of each pair, said one device of each pair having unlike terminals connected together, means connected from the points between the devices of each pair to points in said anode circuit for causing major direct-current to flow through the other device of each pair when said one device of said pair is non-conducting, and means coupled to said plate and said cathode for combining the voltage changes appearing at said plate with voltage changes appearing at said cathode.

4. In combination, a vacuum tube including a cathode, a grid, and an anode, an input circuit connected to the grid and cathode of said tube, an output circuit connected to the plate and cathode of said tube, a load resistance connected in said output circuit, a cathode resistance which is many times as large as said load resistance included in both said input and output circuits, circuit means for introducing a discontinuity in the input-output characteristics of said tube by shunting said cathode resistance at a predetermined input voltage level, said circuit means including a pair of serially related asymmetrically conducting devices having like electrodes connected together, said like electrodes also being connected to a first point on one side of said cathode resistance by a circuit including resistance which is also many times as large as said load resistance, said pair of serially connected diodes being connected between a point on the other side of said cathode resistance and a reference voltage point, means for producing a voltage differential between said cathode resistance and said reference point, and means for substantially isolating said reference voltage point and the circuit connecting said reference voltage point to said asymmetrically conducting devices from signals applied to said input circuit.

5. In combination, an amplification device having an input circuit and an output circuit, said input circuit having a portion thereof in common with said output circuit, a first impedance in said common circuit, a load impedance in said output circuit, and circuit control means for abruptly changing the state of conduction of said amplification device; said circuit control means including a shunt impedance, a reference potential point, two asymmetrically conducting devices connected in a series circuit from a point in said common circuit between said first impedance and said amplification device to said reference potential point, the portion of said series circuit connecting said reference potential point to said asymmetrically conducting devices being isolated from said input circuit and said output circuit, said asymmetrically conducting devices having like terminals connected together and to one terminal of said shunt impedance, and circuit means for continuously supplying current of one polarity through said shunt impedance to said like terminals and through at least one of said asymmetrically conducting devices to bias at least one of said asymmetrically conducting devices in the low resistance state.

6. A combination as defined in claim 5 wherein said amplification device is a vacuum tube and said first impedance is a cathode impedance.

7. A combination as defined in claim 5 wherein said asymmetrically conducting devices are poled to conduct positive current toward said like terminals which are connected together.

8. A combination as defined in claim 5 wherein said asymmetrically conducting devices are poled to conduct positive current away from said like terminals which are connected together.

References Cited in the file of this patent

UNITED STATES PATENTS

| | | |
|---|---|---|
| 2,428,541 | Bagley | Oct. 7, 1947 |
| 2,528,885 | Hendricks | Nov. 7, 1950 |

(Other references on following page)

UNITED STATES PATENTS

| | | |
|---|---|---|
| 2,535,303 | Lewis | Dec. 26, 1950 |
| 2,535,325 | Smeltzer | Dec. 26, 1950 |
| 2,541,932 | Melhose | Feb. 13, 1951 |
| 2,546,338 | Glasford | Mar. 27, 1951 |
| 2,551,150 | McGoffin | May 1, 1951 |
| 2,557,729 | Eckert | June 19, 1951 |
| 2,561,182 | Crane | July 17, 1951 |
| 2,584,986 | Clark | Feb. 12, 1952 |
| 2,610,243 | Burkhart et al. | Sept. 9, 1952 |
| 2,612,550 | Jacobi | Sept. 30, 1952 |
| 2,616,965 | Hoeppner | Nov. 4, 1952 |
| 2,665,332 | Weiss | Jan. 5, 1954 |